(12) United States Patent  (10) Patent No.: US 8,281,576 B2
Parnin  (45) Date of Patent: Oct. 9, 2012

(54) DIESEL PARTICULATE FILTER CONTROL

(75) Inventor: Christopher Parnin, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 259 days.

(21) Appl. No.: 12/778,929

(22) Filed: May 12, 2010

(65) Prior Publication Data

US 2011/0131950 A1  Jun. 9, 2011

(51) Int. Cl.
*F01N 3/00* (2006.01)
(52) U.S. Cl. ........... 60/297; 60/274; 60/285; 60/303; 73/114.69; 73/114.75
(58) Field of Classification Search ........... 60/274, 60/284–287, 295–301, 311; 73/114.69, 114.71, 73/114.73, 114.75; 701/109, 29.8, 30.3–31.9, 701/33.5
See application file for complete search history.

(56) References Cited

U.S. PATENT DOCUMENTS

| | | | | |
|---|---|---|---|---|
| 4,485,666 A * | 12/1984 | Higgins et al. | | 73/23.2 |
| 4,759,210 A * | 7/1988 | Wohltjen | | 73/31.07 |
| 6,439,027 B1 * | 8/2002 | Hiss, III | | 73/28.01 |
| 6,516,654 B2 * | 2/2003 | Uchihara et al. | | 73/28.04 |
| 6,922,639 B2 | 7/2005 | Kawase et al. | | |
| 7,031,827 B2 * | 4/2006 | Trudell et al. | | 701/114 |
| 7,055,311 B2 | 6/2006 | Beutel et al. | | |
| 7,155,334 B1 * | 12/2006 | Stewart et al. | | 701/114 |
| 7,574,307 B2 * | 8/2009 | Silvis et al. | | 702/30 |
| 2008/0178853 A1 | 7/2008 | Yamaoka et al. | | |
| 2008/0250773 A1 | 10/2008 | Zhang et al. | | |
| 2009/0320562 A1 * | 12/2009 | Kilps et al. | | 73/28.05 |
| 2011/0131950 A1 * | 6/2011 | Parnin | | 60/274 |

OTHER PUBLICATIONS

Parnin, Christopher, "Diesel Particulate Filter Control", U.S. Appl. No. 12/778,894; filed May 12, 2010; FGT093233U01; 33 pgs.

* cited by examiner

*Primary Examiner* — Binh Q Tran
*Assistant Examiner* — Jesse Bogue
(74) *Attorney, Agent, or Firm* — Julia Voutyras; Alleman Hall McCoy Russell & Tuttle LLP (57) ABSTRACT

Methods and systems are provided for managing particulate emissions in an engine including a particulate filter and a $CO_2$ sensor downstream of the filter. A $CO_2$ sensor may be used to infer the presence of particulate matter in the exhaust, downstream of the filter. By sensing particulate matter in the post-filter exhaust, filter degradation may be identified.

17 Claims, 5 Drawing Sheets

DIESEL PARTICULATE FILTER CONTROL

FIELD

The present description relates to particulate matter purifying systems for internal combustion engines, such as diesel engines and gasoline engines.

BACKGROUND AND SUMMARY

Emission control devices, such as diesel particulate filters (DPF), may reduce the amount of particulate matter emissions (such as, soot) from a diesel engine by trapping the particles. Such devices may be regenerated during engine operation to decrease the amount of trapped particulate matter (for example, by burning) and maintain the collection capacity of the device. To meet stringent federal government emissions standards, regeneration operations and DPF functionality may be tightly controlled and regularly assessed.

One example approach for controlling diesel particulate filters is illustrated by Stewart et al. in U.S. Pat. No. 7,155,334. Therein, an engine controller controls filter regeneration based on inputs received from sensors, such as particulate matter sensors and/or carbon dioxide sensors, positioned upstream and downstream of the filter.

However, the inventor herein has recognized issues with such an approach. As one example, the use of resistive sensing-based particulate matter (PM) sensors reduces the ability of an engine control system to differentiate between a degraded filter and a degraded regeneration operation. As such, commonly used PM sensors may be configured to detect the presence of PMs electrically, based on a change in resistance or capacitance across an electrical circuit. Such sensors may have a "dead-band" during which PMs may have to accumulate before the sensor is able to respond. This additional time required to detect PMs may reduce the electrical sensor's sensitivity to a degraded DPF. Similarly, relatively small differences in resistance may reduce the ability to distinguish between a degraded DPF and a marginal DPF. Thus, in one instance, the system may not be able to identify DPF degradation.

As another example, the use of input from $CO_2$ sensors that sense exhaust $CO_2$ levels may also reduce the system's ability to accurately estimate the soot load on the filter due to an indirect correlation between filter soot levels and exhaust $CO_2$ levels. Since the exhaust $CO_2$ level is more representative of combustion conditions, a soot load may be inferred but not accurately determined.

Thus, in one example, some of the above issues may be addressed by a method of operating an engine exhaust system including a particulate filter comprising, controlling filter regeneration based on a $CO_2$ signature of oxidized, post-filter exhaust particulate matters (PMs). The $CO_2$ signature may include a $CO_2$ level of oxidized PMs estimated by a $CO_2$ sensor positioned downstream of the filter.

In one example, a diesel engine exhaust system may be configured with a filter substrate and a $CO_2$ sensor positioned downstream of a DPF. During filter regeneration, an engine controller may heat the substrate and oxidize post-filter exhaust particulate matters (that is, exhaust soot) on the heated substrate using oxygen present in the exhaust gas. The substrate may be heated by the flow of hot exhaust gas, as used during filter regeneration, through the substrate. The $CO_2$ generated during regeneration, from oxidation of exhaust soot on the substrate, may be estimated by the downstream $CO_2$ sensor to determine a regeneration $CO_2$ signature of oxidized, post-filter exhaust particulate matters (PMs). The regeneration $CO_2$ signature may at least include a $CO_2$ level of the oxidized PMs. Since the generated $CO_2$ is largely dependent on the quantity of exhaust soot oxidized on the heated substrate, a direct correlation may be made between the estimated exhaust $CO_2$ level and an exhaust soot level. In other words, the $CO_2$ sensor may be used as a PM sensor. The $CO_2$ level may be monitored, over at least a duration of the regeneration, to perform filter diagnostics and/or assess the efficiency of the regeneration operation. Specifically, the controller may indicate filter degradation based on the $CO_2$ signature. The controller may then adjust engine and filter operations based on the $CO_2$ signature. During other engine running conditions, the $CO_2$ sensor may be used to sense an exhaust $CO_2$ level unrelated to post-filter exhaust PMs.

For example, based on regeneration conditions, such as an estimated soot load, burn rate, exhaust temperature, exhaust flow rate, etc., an engine controller may determine an expected regeneration $CO_2$ level, signature, and/or profile. A $CO_2$ level of post-filter oxidized exhaust PMs may then be estimated in real-time during regeneration, for example, at fixed intervals since the initiation of the regeneration operation, and compared to the expected values. As such, low to substantially no exhaust PMs may be expected in the post-filter exhaust. Herein, by comparing the output of the $CO_2$ sensor to $CO_2$ levels expected based on the engine's operating conditions and regeneration conditions, exhaust PMs may be identified in the post-filter exhaust and may be used to infer filter degradation. In one example, based on the comparison, the controller may determine whether the filter is degraded and further whether the regeneration operation is degraded. If there is no degradation, the sensor output may be used to infer whether regeneration has been completed or not and to adjust engine operations accordingly. For example, the controller may identify a degraded filter when the estimated regeneration $CO_2$ level (that is, sensor output) is higher than the expected regeneration $CO_2$ level. Similarly, the controller may identify a degraded regeneration operation when the estimated regeneration $CO_2$ level is below a threshold. The controller may adjust regeneration conditions (such as the burn rate, flow rate, etc.) in real-time for the same operation, or for a subsequent operation responsive to the indication of filter and/or regeneration degradation. For example, if the filter is degraded (e.g., cracked) and PMs are being detected in the post-filter exhaust, the regeneration conditions may be restricted to lower temperatures, lower durations, lower soot load thresholds, etc., so as to reduce the risk of further PM slip into the exhaust emissions. In another example, if the regeneration is degraded (e.g., not enough of the stored soot is being burned effectively), the regeneration conditions may be reconfigured to higher temperatures, higher burn rates, longer durations, higher soot load thresholds, etc., so as to increase the amount of stored soot that is burned off. In addition to controlling filter regeneration, the engine controller may adjust alternate engine operations based on the $CO_2$ signature.

It will be appreciated that while the depicted example illustrates application of the $CO_2$ sensor in a diesel engine exhaust system, this is not meant to be limiting, and the same $CO_2$ sensor may be similarly applied in alternate engine exhaust systems, such as to diagnose a gasoline particulate filter in a gasoline engine exhaust system.

In this way, the presence of soot in engine exhaust may be detected by oxidizing the soot to generate $CO_2$, and by using downstream $CO_2$ sensors to provide a more direct and more precise estimate of exhaust soot levels, in addition to their use in estimating exhaust $CO_2$ levels. By enabling an accurate, real-time estimate of exhaust soot levels, filter regeneration may be better controlled. Additionally, the higher sensitivity of the $CO_2$ gas sensors may reduce the "dead-band" effect of resistive sensors and provide higher resolution between signals. This higher resolution may improve the ability to identify a degraded particulate filter, and further to distinguish between a degraded filter and reduced filter functionality. Similarly, the higher resolution may improve the ability to distinguish between a degraded filter and a degraded regeneration operation. By improving regeneration and filter diagnostics, the quality of exhaust emissions maybe improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
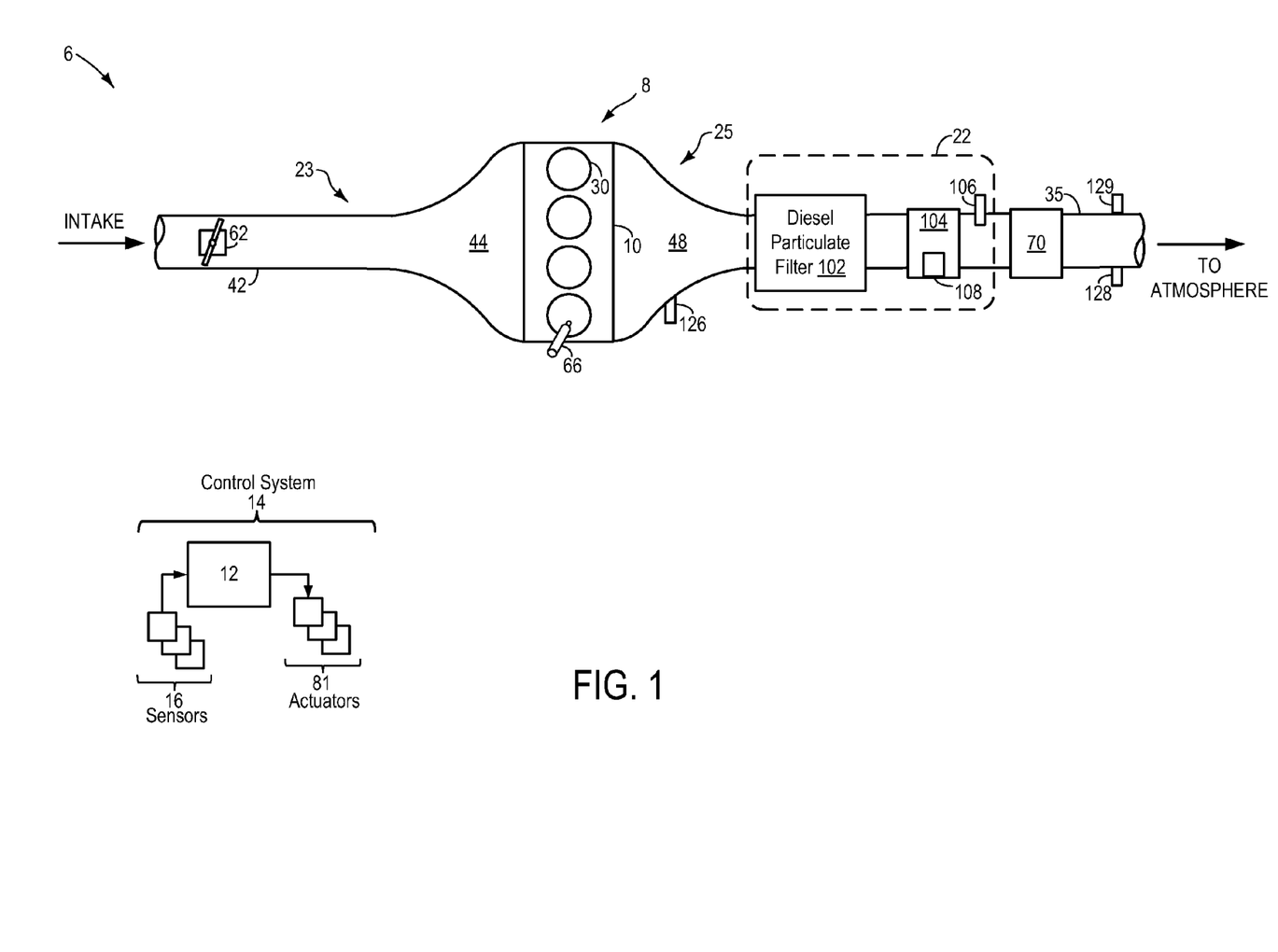
FIG. 1 shows a schematic depiction of an engine and an associated particulate matter retaining system.
Figure 2:
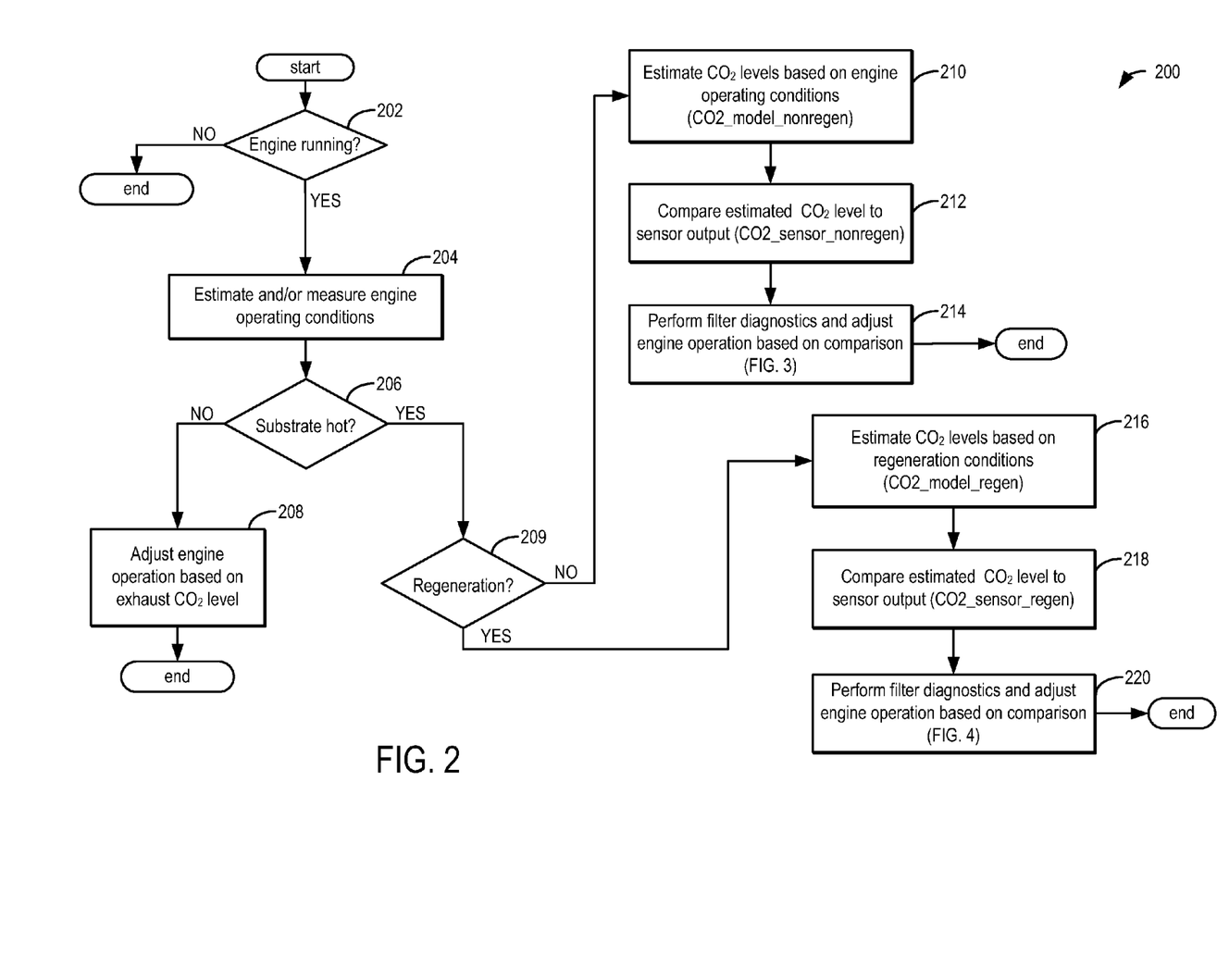
FIGS. 2-5 show high level flow charts illustrating routines that may be implemented for controlling and diagnosing filter regeneration and filter functionality, using $CO_2$ sensors, in the particulate matter retaining system of FIG. 1, according to the present disclosure.
Figure 3:
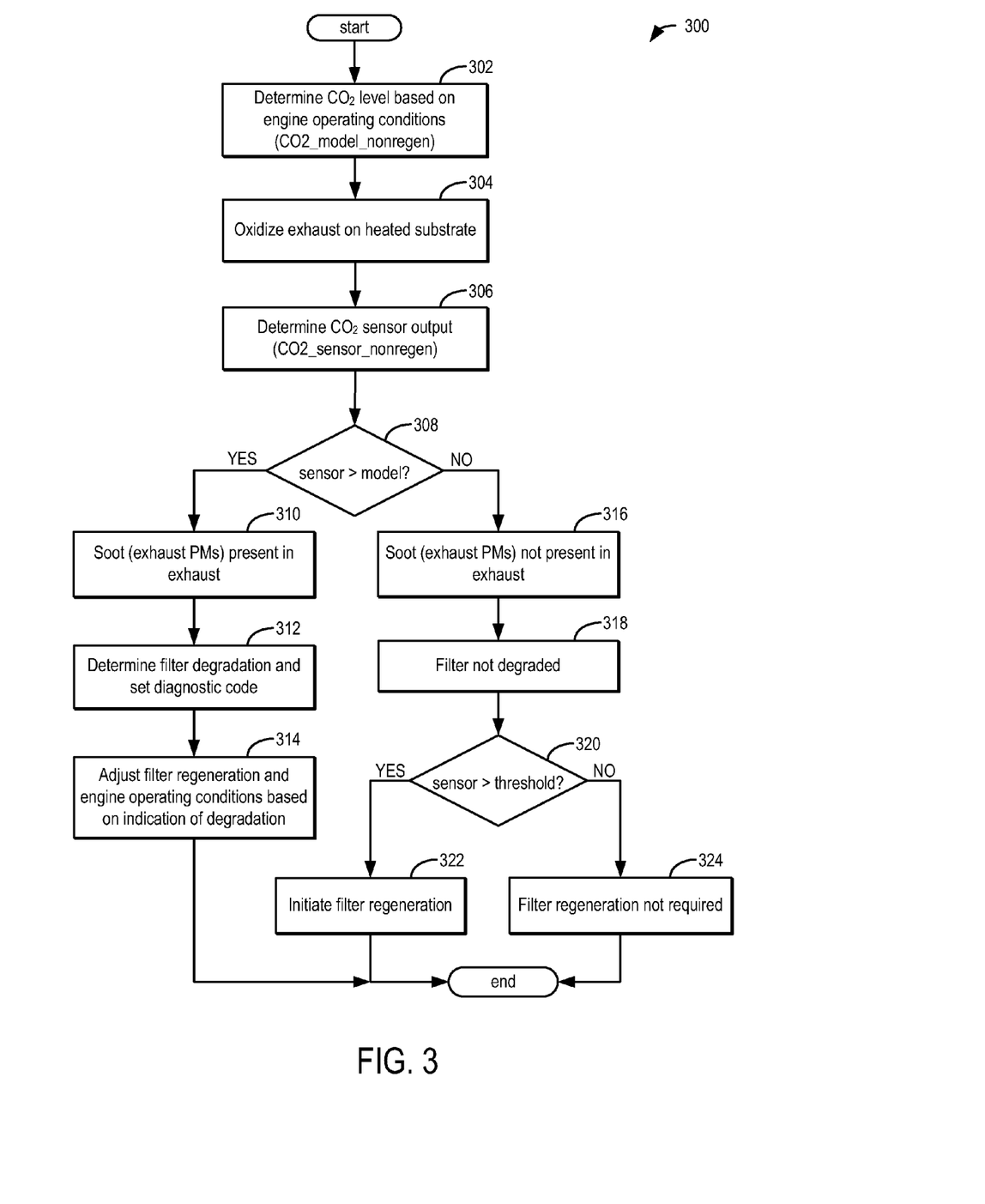
Figure 4:
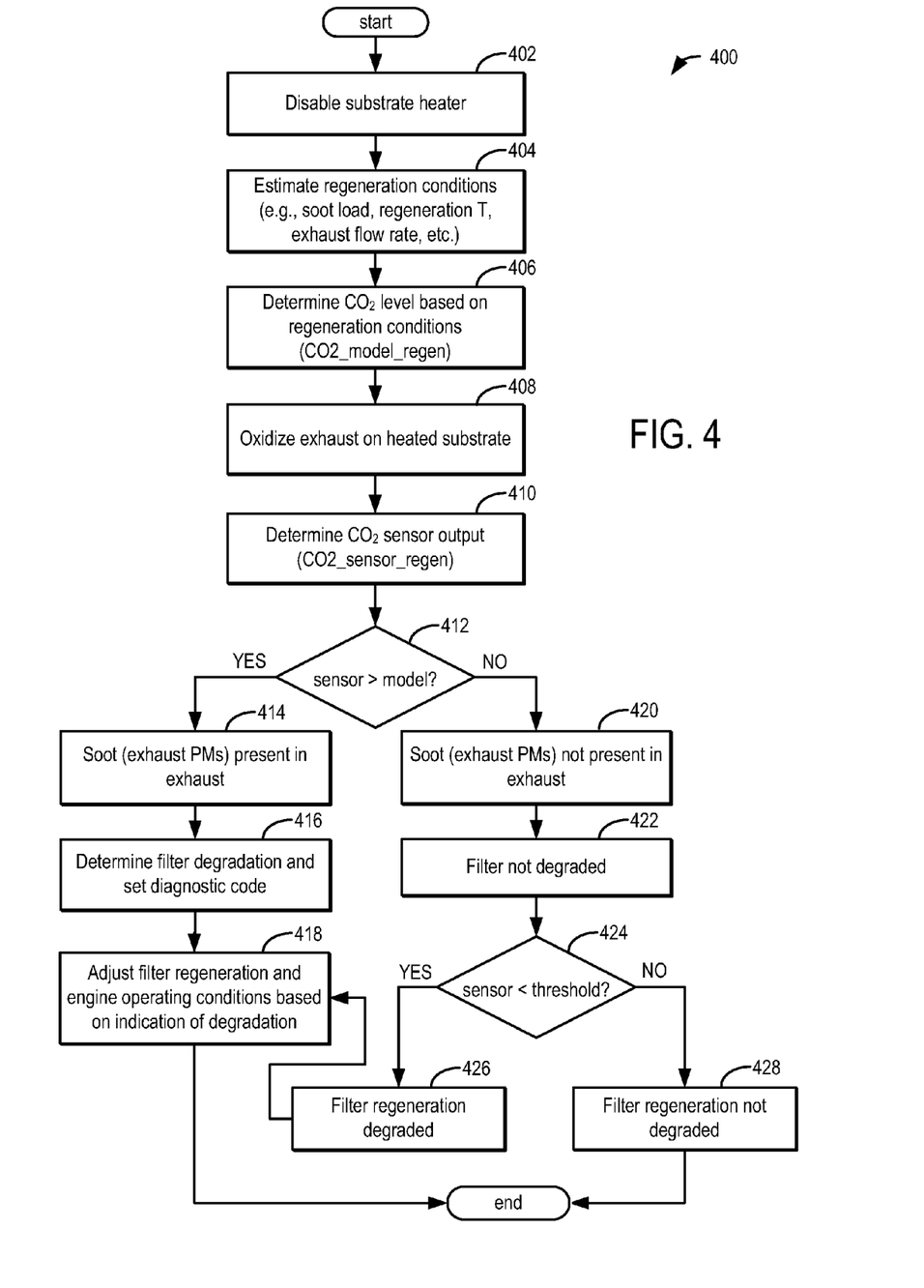
Figure 5:
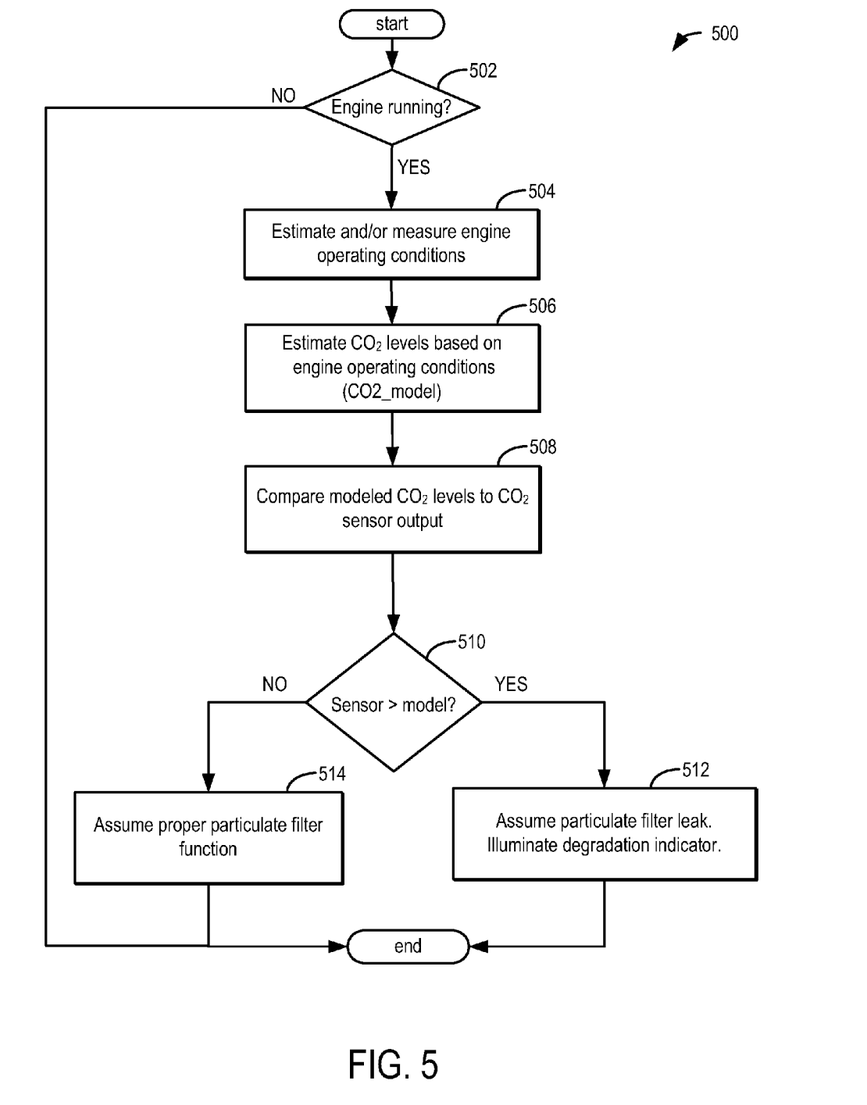

The following description relates to systems and methods for controlling a particulate matter retaining system, such as the diesel particulate matter (PM) retaining system of FIG. 1. As shown therein, the PM retaining system may include a diesel particulate filter, a filter substrate, and a $CO_2$ gas sensor positioned downstream of the filter and the substrate. As shown in FIG. 2, when the substrate is not heated, that is, the substrate is not enabled for oxidizing, the $CO_2$ sensor may be used to estimate exhaust $CO_2$ levels and adjust engine operation based on the estimated value. When the substrate is enabled for oxidizing (for example, when the substrate is electrically heated by a dedicated substrate heater, or non-electrically heated by hot exhaust gas), post-filter exhaust may be passed over the heated substrate and exhaust PMs, if present, may be oxidized to $CO_2$ using oxygen from the exhaust gas on the substrate upstream of the $CO_2$ sensor. Herein, the $CO_2$ sensor may be used to more accurately infer the presence of exhaust PMs, and an exhaust PM level, due to a direct correlation between the $CO_2$ gas generated on the substrate and the oxidized PMs. Accordingly, a $CO_2$ signature may be generated by the sensor during filter storing and/or regeneration conditions. As shown in FIGS. 3-5, by comparing an estimated $CO_2$ level (based on the sensor output) with an expected $CO_2$ level (based on, for example, engine operating or regeneration operation conditions), filter degradation may be identified, and distinguished from a degraded regeneration. In this way, a $CO_2$ sensor may be advantageously used to accurately identify the presence of PMs in post-filter exhaust, and provide more accurate control over filter functionality and regeneration efficacy. By reducing the need for resistive-sensing PM sensors, higher signal resolutions may be achieved, enabling improved emissions control.

FIG. 1 shows a schematic depiction of a vehicle system 6. The vehicle system 6 includes an engine system 8 coupled to a particulate matter (PM) retaining system 22. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as a turbocharger, (not shown) and upstream of an after-cooler (not shown). When included, the after-cooler may be configured to reduce the temperature of intake air compressed by the boosting device.

Engine exhaust 25 may include one or more emission control devices 70, which may be mounted in a close-coupled position in the exhaust. One or more emission control devices may include a three-way catalyst, lean NOx filter, SCR catalyst, etc. Engine exhaust 25 may also include PM retaining system 22 positioned upstream of emission control device 70. In one example, as depicted, PM retaining system 22 is a diesel particulate matter retaining system. Tailpipe exhaust gas that has been filtered of PMs, following passage through PM retaining system 22, may be further processed in emission control device 70 and expelled to the atmosphere via exhaust passage 35.

PM retaining system 22 may include one or more PM retaining devices, such as a diesel particulate filter (DPF) 102, to temporarily filter PMs from entering gases. DPF 102 may have a monolith structure made of, for example, cordierite or silicon carbide, with a plurality of channels inside for filtering particulate matter from diesel exhaust gas. PM retaining system 22 may further include substrate 104 positioned downstream of DPF 102, and a $CO_2$ gas sensor 106 positioned downstream of substrate 104. Substrate 104 may be heated non-electrically, for example by the passage of heated exhaust gas, or electrically, for example by the operation of a dedicated substrate heater 108, to oxidize post-filter exhaust PMs, or soot, into $CO_2$. A $CO_2$ signature of the post-filter oxidized PMs may then be obtained using the downstream $CO_2$ sensor.

Substrate 104 may have a monolith structure similar to DPF 102, made of, for example, cordierite, silicon carbide, etc. The substrate may not be catalyzed, consequently functioning similar to a filter. In one example, the diameter of substrate 104 may be configured to match the diameter of exhaust passage 35 so as to enable all exhaust gas to glow through the substrate. The length of substrate 104 may be adjusted based on desired storage properties. In the depicted embodiment, wherein substrate 104 may not have substantial soot storing functions, a shorter substrate may be used (for example, 50 mm or less). In alternate embodiments, wherein substrate 104 may be required to store soot in addition to oxidizing exhaust soot, a longer substrate may be employed.

Substrate 104 may be heated by substrate heater 108. In one example, as depicted, heater 108 may be an internal heater, such as an electrical resistance heater woven into the substrate. The electrical resistance heater may be controlled, using PWM control, to adjust the temperature of the substrate to a desired temperature. In alternate examples, the heater may be an external heater. In one example, the operation of substrate heater 108 may be based on exhaust gas temperature. Thus, the substrate heater may be turned on when the exhaust gas temperature is below a threshold (such as during filter storing), and turned off when the exhaust gas temperature is above the threshold (such as during filter regeneration). Alternatively, substrate heater operation may be based on filter conditions. Herein, the heater may be turned on when the filter is in a storing mode, and may be turned off when the filter is in a regenerating mode.

While the depicted example illustrates substrate 104 downstream of DPF 102, in alternate embodiments, substrate 104 may be included in DPF 102. During engine operation, substrate 104 may be heated, for example, due to the flow of heated exhaust gas over the substrate. Alternatively, substrate 104 may be heated by a dedicated heater. Heated substrate 104 may oxidize exhaust PMs on the substrate using oxygen from the exhaust. The oxidized PMs, such as soot, may thereby be combusted to generate $CO_2$. Downstream $CO_2$ sensor 106 may be configured to provide an accurate estimate of the generated $CO_2$ level. An exhaust PM level may then be determined or inferred by an engine controller 12 based on the estimated $CO_2$ level.

During engine operation, exhaust gas PMs may be retained and collected on DPF 102. Thus, an amount of post-filter exhaust PMs may be substantially low in the absence of filter degradation. Consequently, there may be substantially no difference between a $CO_2$ level sensed by the $CO_2$ sensor (that is, a sensor output) and a $CO_2$ level expected based on engine operating conditions. In the event of filter degradation (such as, due to a crack in the filter), soot may escape from the filter and may be detected due to a sudden increase in $CO_2$ levels estimated by the downstream sensor, due to oxidation of the released soot on the post-filter substrate. Post-filter exhaust PM levels may be determined based on $CO_2$ levels sensed by $CO_2$ sensor 106, downstream of substrate 104. For example, a real-time estimate of PM levels may be obtained. As further elaborated with reference to FIGS. 2-4, by monitoring the estimated $CO_2$ levels and/or inferred PM levels, DPF 102 operations may be assessed and filter diagnostic routines may be performed. In one example, in response to an increase in $CO_2$ levels above a threshold, during engine operation, filter saturation may be deduced and filter regeneration may be initiated. In another example, in response to $CO_2$ levels being above an upper threshold (or below a lower threshold) during and/or following filter regeneration, filter degradation may be diagnosed and filter diagnostic codes may be set.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), temperature sensor 128 and pressure sensor 129 (located downstream of emission control device 70), and $CO_2$ sensor 106 (located downstream of DPF 102 and substrate 104). Other sensors such as additional pressure, temperature, air/fuel ratio, and composition sensors may be coupled to various locations in the vehicle system 6. As another example, the actuators may include fuel injectors 66, throttle 62, DPF valves that control filter regeneration (not shown), etc. The control system 14 may include a controller 12. The controller may receive input data from the various sensors, process the input data, and trigger the actuators in response to the processed input data based on instruction or code programmed therein corresponding to one or more routines. Example control routines are described herein with reference to FIGS. 2-5.

FIG. 2 illustrates an example routine 200 for adjusting engine and filter operation based on feedback from a $CO_2$ sensor positioned downstream of a particulate filter in an engine exhaust. Specifically, by using the $CO_2$ sensor to estimate an exhaust $CO_2$ level and/or infer the presence of post-filter exhaust PMs, filter diagnostics may be performed during all engine running conditions including filter storing and filter regeneration.

At 202, the routine includes confirming that the engine is running. If the engine is not running, the routine may end. At 204, engine operating conditions may be estimated and/or inferred. These may include, for example, driver requested torque, engine temperature, exhaust gas temperature, exhaust gas composition, air-fuel ratio, etc. At 206, it may be determined whether a substrate positioned downstream of the particulate filter in the particulate matter retaining system (FIG. 1) is oxidizing. As such, the substrate may be enabled for oxidizing PMs when it is heated (for example, above a threshold temperature). In one example, the substrate may be electrically heated by operating the dedicated substrate heater. In another example, the substrate may be non-electrically heated by the flow of hot exhaust gas there-through. As such, when the substrate is hot and enabled for oxidizing, exhaust PMs, if present, may be collected and oxidized on the substrate using oxygen from the exhaust. Thus, if the substrate is not oxidizing, at 208, the $CO_2$ sensor may provide an estimate of exhaust $CO_2$ levels only, and an engine controller may be configured to adjust engine operation and perform engine component diagnostics based on the estimated exhaust $CO_2$ level. For example, the exhaust $CO_2$ level may be used to adjust an amount of EGR, an amount of boost, valve timing, etc. Similarly, the exhaust $CO_2$ level may be used to diagnose degradation in components such as EGR components, etc.

If the substrate is oxidizing, at 209, it may be determined whether filter regeneration has been enabled. If filter regeneration has not been enabled, then at 210, expected $CO_2$ levels (CO2_model_nonregen) may be estimated based on engine operating conditions. At 212, the estimated $CO_2$ level may be compared to a $CO_2$ signature output by the sensor (CO2_sensor_non-regen). At 214, filter diagnostics may be performed and engine operation may be adjusted based on the comparison between the estimated $CO_2$ level and the $CO_2$ signature of the sensor. Herein, the $CO_2$ sensor output may reflect a $CO_2$ signature corresponding to exhaust $CO_2$ levels including $CO_2$ generated by the oxidation of exhaust PMs on the heated substrate. Thus, the $CO_2$ signature may be used to infer the presence of post-filter exhaust PMs, and a post-filter exhaust PM level. In one example, inferring an exhaust PM level based on the estimated $CO_2$ signature may include determining what fraction of the $CO_2$ signature corresponds to non-soot exhaust $CO_2$ levels, and subtracting that fraction from the estimated $CO_2$ signature. Alternate algorithms may be used to compensate for exhaust non-soot $CO_2$ levels when determining the $CO_2$ level corresponding to the oxidized post-filter exhaust PMs. As further elaborated with reference to FIG. 3, adjusting engine operations and performing filter diagnostics based on a comparison between the estimated $CO_2$ level and the sensor output $CO_2$ signature may include diagnosing leak of exhaust PMs from a degraded filter, initiating filter regeneration and/or adjusting filter regeneration conditions (exhaust flow rate, exhaust temperature, etc.) based on the $CO_2$ signature.

Thus, during a first engine running condition, when the filter is storing and the substrate is not oxidizing, engine operation may be adjusted based on an exhaust $CO_2$ level estimated by the $CO_2$ sensor. Then, during a second engine running condition, different from the first engine running condition, when the filter is storing and the substrate is oxidizing (e.g., being heated by a substrate heater), engine operation may be adjusted based on the estimated $CO_2$ level of oxidized, post-filter exhaust PMs.

Now turning to FIG. 3, an example routine 300 is shown for diagnosing filter degradation and adjusting engine operation during engine running conditions where the substrate is oxidizing and the filter is storing. That is, the depicted routine may be performed during non-regeneration conditions. As such, during filter storing conditions, exhaust PMs may be retained in the filter and substantially no PMs may be present in the post-filter exhaust. Consequently, a degraded filter may be diagnosed due to the presence of PMs in the post-filter exhaust, based on a $CO_2$ signature determined by an exhaust $CO_2$ sensor downstream of the oxidizing substrate. By using a $CO_2$ sensor, a degraded filter may be distinguished from a marginal filter, and filter regeneration may be initiated accordingly.

At 302, the routine may include determining an expected $CO_2$ level (CO2_model_nonregen) based on the estimated engine operating conditions. For example, an expected $CO_2$ level may be based on an expected soot load, an exhaust air-fuel ratio, a duration of engine operation since engine start, an exhaust flow rate, etc. At 304, post-filter exhaust may be oxidized on the heated substrate. If present, exhaust PMs that have not been retained in the filter may be oxidized on the heated substrate using oxygen from the exhaust gas. In one example, during filter storing, when the exhaust gas temperature is below a threshold, the substrate may be electrically heated by operating a substrate heater. At 306, the $CO_2$ sensor's output may be determined (CO2_sensor_nonregen), and a $CO_2$ signature may be determined. The $CO_2$ signature may account for $CO_2$ from non-PM $CO_2$ sources, such as exhaust $CO_2$ from in-cylinder combustion events, as well as $CO_2$ generated due to the presence of PMs in the post-filter exhaust.

At 308, it may be determined whether the estimated $CO_2$ level as sensed by the $CO_2$ sensor (at 306) is higher than the expected $CO_2$ level (as determined based on models at 302). If yes, then at 310, it may be determined that soot (that is, exhaust PMs) are present in the exhaust. As previously elaborated, in the absence of filter degradation, exhaust PMs are retained in the filter. Thus, at 312, in response to the detection of post-filter exhaust PMs, filter degradation may be determined and indicated by setting a diagnostic code. Setting a diagnostic code may include, for example, illuminating a light on a vehicle dashboard to indicate filter degradation to the vehicle operator. Optionally, based on the $CO_2$ signature, a degree of filter degradation may also be indicated. For example, a smaller difference between the estimated level output by the sensor and the expected level may reflect a smaller degree of filter degradation (such as, release of PMs due to a small filter leak), while a larger difference may reflect a larger degree of filter degradation (such as, release of PMs due to a large filter crack). At 314, based on the indication of degradation, filter regeneration and engine operating conditions may be adjusted. In one example, in response to the indication of degradation, a subsequent filter regeneration operation may be performed for a shorter duration, at a relatively lower temperature, and/or in response to a lower threshold of stored PMs. In another example, in response to the indication of filter degradation, an engine load may be reduced to reduce the amount of PMs generated.

In comparison, if the estimated exhaust $CO_2$ level is below the expected level, then at 316, it may be determined that no soot is present in the exhaust. Consequently, at 318, it may be inferred that the filter is not degraded and can retain exhaust PMs. At 320, it may be further determined whether the estimated exhaust $CO_2$ level is above a threshold. If the estimated exhaust $CO_2$ level is contained below the threshold, then at 324, it may be determined that the filter has not yet reached its storage capacity and filter regeneration is not required. If the estimated exhaust $CO_2$ level is above the threshold, then at 322 it may be determined that the filter has approached its storage capacity and filter regeneration may be initiated to restore the filter's storage capacity.

Now turning to FIG. 4, an example routine 400 is described for diagnosing filter degradation during a filter regeneration operation. Additionally, the routine may enable the filter regeneration operation to be monitored, and allow a degraded filter regeneration operation to be distinguished from a degraded filter condition.

At 402, the substrate heater may be disabled (e.g., turned off) and filter regeneration may be initiated. As such, filter regeneration may be initiated based on engine operating conditions such as, engine torque, exhaust gas temperature, flow rate, and composition, etc. In one example, filter regeneration may be initiated responsive to the exhaust temperature being above a threshold, a threshold duration since the engine start having elapsed, a threshold duration since a previous filter regeneration operation having elapsed, etc.

As such, during filter regeneration, hot exhaust gas may be directed at a predetermined flow rate through the filter to burn particulate matter stored therein during a previous storing cycle. Thus, during regeneration, the substrate heater may not be operated while the heated exhaust is advantageously used to also heat the downstream substrate. In one example, the heater may be controlled responsive to exhaust temperature. For example, when the exhaust gas temperature is above a threshold (such as above a regeneration temperature), the substrate heater may be turned off, and when the exhaust gas temperature is below the threshold, the substrate heater may be turned on.

At 404, the regeneration conditions may be estimated. These may include estimating an exhaust gas flow rate and temperature to be used for the regeneration. Additionally, the soot load on the filter before regeneration may be estimated. At 406, based on the estimated regeneration conditions, a corresponding expected $CO_2$ regeneration signature/$CO_2$ level may be determined (CO2_model_regen). In one example, the expected $CO_2$ signature may be a $CO_2$ level profile expected for the duration of the regeneration. As such, the $CO_2$ level may increase or decrease depending on conditions during filter regeneration. In one example, the $CO_2$ level may be expected to increase soon after the regeneration is initiated as the stored PMs are burned off, and then the $CO_2$ level may decrease. At 408, post-filter exhaust PMs may be oxidized on the heated substrate using oxygen from the exhaust gas. At 410, a $CO_2$ level of the post-filter exhaust (CO2_sensor_regen) may be estimated by the downstream $CO_2$ sensor. Accordingly, an estimated $CO_2$ signature may be determined. The estimated $CO_2$ level may reflect $CO_2$ from non-PM sources, such as $CO_2$ from in-cylinder combustion events, as well as $CO_2$ released from the burning of PMs stored in the filter. Additionally, the estimated $CO_2$ level may reflect $CO_2$ from post-filter exhaust PMs, if present, that are oxidized on the heated substrate. At 412, the sensor output estimated regeneration $CO_2$ level may be compared to the model based expected regeneration $CO_2$ level and it may be determined if the sensor output is higher than the modeled value. If yes, then at 414, it may be determined that soot is present in the exhaust. As previously elaborated, in the absence of filter degradation, exhaust PMs are retained in the filter. Thus, at 416, in response to the detection of post-filter exhaust PMs, filter degradation may be determined and indicated by setting a diagnostic code. Optionally, as previously elaborated in FIG. 3 (at 312), based on the $CO_2$ signature, a degree of filter degradation may also be indicated. At 418, based on the indication of degradation, engine operating conditions and/or regeneration conditions for the same and/or a subsequent regeneration operation, may be adjusted. In one example, in response to the indication of degradation, the filter regeneration operation may be stopped (for example, immediately) to reduce the risk of degraded exhaust emissions. In another example, a regeneration exhaust flow rate may be decreased, a regeneration exhaust temperature may be lowered, a duration of regeneration may be decreased, and/or regeneration may be initiated at a higher soot load. In another example, in response to the indication of filter degradation, the engine load may be reduced to reduce the amount of PMs generated.

If the sensor output is not higher than the expected model value, then at 420, it may be determined that no soot is present in the exhaust, and it may be inferred that the filter is not degraded at 422. At 424, it may be determined if the estimated regeneration $CO_2$ level (or profile) is lower than a threshold. As such, during filter regeneration, an increase in $CO_2$ levels (such as, a sudden burst in $CO_2$ level following the initiation of regeneration) may be expected due to the burning off the stored soot. Thus, at 426, filter regeneration degradation may be determined when the estimated regeneration $CO_2$ level is lower than the threshold level. That is, it may be determined that the filter regeneration operation is degraded and that the soot stored on the filter has not been completely removed. Optionally, an engine controller may further adjust regeneration conditions, for the same and/or a subsequent regeneration operation, responsive to the indication of filter regeneration degradation at 418. For example, in response to the filter not being degraded but the filter regeneration operation being degraded, the exhaust flow rate for a subsequent regeneration may be increased, the exhaust temperature used for regeneration may be raised, the duration of regeneration may be increased, and/or regeneration may be initiated at a lower soot load.

In comparison, if the estimated regeneration $CO_2$ level is below the threshold, then at 428, it may be determined that the filter is not degraded and that the filter regeneration operation is also not degraded.

Thus, during filter storing, an engine controller may electrically heat the substrate with the heater, estimate a post-filter exhaust $CO_2$ level to infer the presence of post filter exhaust PMs with the $CO_2$ sensor, and control filter regeneration and adjust engine operation based on the estimated exhaust $CO_2$ level. Similarly, during a filter regeneration condition, different from the filter storing condition, the controller may disable the heater and non-electrically heat the substrate using the hot exhaust gas used for filter regeneration. The controller may then estimate a post-filter exhaust $CO_2$ level to infer the presence of post filter exhaust PMs with the $CO_2$ sensor, and control filter regeneration and adjust engine operation based on the estimated exhaust $CO_2$ level. In either condition, the sensor may also enable the controller to determine filter degradation based on a $CO_2$ signature generated from oxidized post-filter PMs.

While the depicted routines illustrate adjusting engine operation and determining filter degradation based on the $CO_2$ signature, it will be appreciated that the engine controller may be further configured to diagnose $CO_2$ sensor degradation based on the estimated $CO_2$ level. Diagnosing $CO_2$ sensor degradation may include setting a corresponding diagnostic code.

In one example, during filter storing, $CO_2$ sensor degradation may be diagnosed by estimating a first $CO_2$ level with the substrate heater on, estimating a second $CO_2$ level with the substrate heater off, and indicating $CO_2$ sensor degradation when a difference between the first $CO_2$ level and the second $CO_2$ level is less than a threshold. For example, when it is known that the filter is not degraded, by comparing the $CO_2$ level estimated by the $CO_2$ sensor with the heater on and off, sensor degradation may be identified due to the sensor not detecting the presence of an anticipated amount of $CO_2$.

In another example, during filter regeneration, $CO_2$ sensor degradation may be diagnosed by determining a first rate of change in the estimated $CO_2$ level over at least a duration of the filter regeneration operation, determining a second rate of change in the pressure across the filter over the same duration, and indicating sensor degradation when a difference between the first and second rate of change is greater than a threshold. Alternatively, sensor degradation may be indicated when a ratio between the first and second rate of change is greater than a threshold. Thus, for example, when it is known that the filter is not degraded and the filter is regenerating, by comparing a parameter reflective of filter regeneration (such as a change in pressure, or temperature, or mass, etc., across the filter) over a duration of the operation with the change in the output from the sensor over the same duration, sensor degradation may be identified due to the sensor output not changing at a rate proportional (or normalized) to the rate of change of the regeneration parameter across the filter.

Now turning to FIG. 5, an alternate example routine 500 is depicted for identifying particulate filter degradation based on the output of a downstream $CO_2$ sensor. At 502, it may be confirmed that the engine is running. As such, if the engine is not running, the routine may end. At 504, engine operating conditions may be estimated, measured and/or inferred. At 506, $CO_2$ levels may be estimated and/or inferred based on the estimated engine operating conditions (CO2_model). In one example, a $CO_2$ model may be used to estimate an expected $CO_2$ level based on the engine operating conditions. The level estimated by the $CO_2$ model may take into account $CO_2$ levels anticipated from exhaust PMs, exhaust $CO_2$, unburned and partially burned exhaust hydrocarbons, etc. At 508, the modeled $CO_2$ level may be compared to the output of the $CO_2$ sensor. At 510, it may be determined whether the $CO_2$ sensor output is higher than the modeled $CO_2$ level. If no, then at 514, it may be assumed that the particulate filter is functioning properly. In comparison, if the $CO_2$ sensor output is higher than the modeled $CO_2$ level, then at 512, it may be assumed that the particulate filter is degraded and a filter degradation indicator may be illuminated. The degradation indicator may be, for example, a light (such as a malfunction indicator light) on the vehicle dashboard, or a message in a message center presented to the driver.

It will be appreciated that while one or more of the routines of FIGS. 2-5 may be illustrated with reference to diesel particulate filters, this is not meant in a limiting sense, and the same routines may be similarly applied towards the diagnosis of degradation of other particulate filters, such as a gasoline particulate filter in a gasoline engine exhaust system.

In this way, an exhaust $CO_2$ sensor may be used to determine exhaust $CO_2$ levels as well as to accurately infer an exhaust PM level. Additionally, based on the estimated $CO_2$ level during filter regenerating and non-regenerating conditions, filter diagnostics may be performed. Based on differences between the estimated level and an expected level, engine operation and/or filter regeneration operation may be further adjusted. By using higher resolution $CO_2$ sensors, filter diagnostics may be performed with higher precision.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine exhaust system including a particulate filter comprising,
controlling filter regeneration based on a $CO_2$ signature of oxidized, post-filter exhaust particulate matters (PMs), the $CO_2$ signature based on a $CO_2$ level estimated by a $CO_2$ sensor positioned downstream of the filter and the exhaust PMs being oxidized on a heated substrate, positioned upstream of the $CO_2$ sensor using oxygen from exhaust gas, the controlling including:
during a filter storing condition, initiating filter regeneration based on the $CO_2$ signature; and
during a filter regenerating condition, determining regeneration degradation based on the $CO_2$ signature.

2. The method of claim 1, wherein the substrate is heated using a heater coupled to the substrate during the filter storing condition, and wherein the substrate is heated using hot exhaust gas during the filter regenerating condition.

3. The method of claim 2, wherein heating the substrate using a heater during filter storing includes enabling the heater, and heating the substrate using hot exhaust gas during filter regenerating includes, disabling the heater.

4. The method of claim 3, wherein determining regeneration degradation includes indicating filter regeneration degradation when an estimated regeneration $CO_2$ level is lower than an expected regeneration $CO_2$ level.

5. The method of claim 4, further comprising, adjusting regeneration conditions responsive to the indication of filter regeneration degradation.

6. The method of claim 5, further comprising, determining filter degradation based on the $CO_2$ signature.

7. The method of claim 6, wherein determining filter degradation includes, during the filter regenerating condition, indicating filter degradation when the estimated regeneration $CO_2$ level is greater than the expected regeneration $CO_2$ level, and a difference between the estimated level and the expected level is greater than a threshold.

8. The method of claim 7, wherein the indication further includes setting a diagnostic code.

9. A method for managing particulate matter emissions of an engine system including a particulate filter, a $CO_2$ sensor downstream of the filter, a substrate upstream of the $CO_2$ sensor, and a substrate heater coupled to the substrate, comprising:
during filter storing,
electrically heating the substrate with the heater;
estimating an exhaust $CO_2$ level of the oxidized exhaust PMs with the $CO_2$ sensor; and
controlling filter regeneration and adjusting engine operation based on the estimated exhaust $CO_2$ level; and
during filter regeneration,
disabling the heater while non-electrically heating the substrate with hot exhaust gas;
estimating an exhaust $CO_2$ level of the oxidized exhaust PMs with the $CO_2$ sensor; and
controlling filter regeneration and adjusting engine operation based on the estimated exhaust $CO_2$ level.

10. The method of claim 9, wherein the engine system is a gasoline engine system, further comprising, during filter storing and/or filter regeneration, determining filter degradation based on the estimated exhaust $CO_2$ level.

11. The method of claim 9, wherein the heater is operated responsive to an exhaust gas temperature, and wherein the operation includes,
turning on the heater when the exhaust gas temperature is below a threshold; and
turning off the heater when the exhaust gas temperature is above the threshold.

12. An engine exhaust system, comprising:
a particulate filter;
a $CO_2$ sensor coupled downstream of the filter;
a substrate positioned upstream of the $CO_2$ sensor; and
a controller configured to,
heat the substrate;
oxidize exhaust PMs on the heated substrate;
estimate a $CO_2$ level corresponding to the oxidized exhaust PMs;
control filter regeneration based on the estimated $CO_2$ level; and
determine filter degradation based on the estimated $CO_2$ level.

13. The system of claim 12, wherein heating the substrate includes, during filter storing, enabling a substrate heater; and during filter regeneration, disabling the substrate heater and flowing hot exhaust gas.

14. The system of claim 13, wherein the controller is further configured to diagnose $CO_2$ sensor degradation based on the estimated $CO_2$ level.

15. The system of claim 14, wherein diagnosing $CO_2$ sensor degradation includes, during filter storing, estimating a first $CO_2$ level with the substrate heater on, estimating a second $CO_2$ level with the substrate heater off, and indicating sensor degradation when a difference between the first $CO_2$ level and second $CO_2$ level is less than a threshold.

16. The system of claim 14, wherein diagnosing $CO_2$ sensor degradation includes, during filter regeneration, determining a first rate of change in the estimated $CO_2$ level over at least a duration of filter regeneration, determining a second rate of change in pressure across the filter over the duration of filter regeneration, and indicating sensor degradation based on the first and second rates of change.

17. The system of claim 14, wherein diagnosing $CO_2$ sensor degradation includes indicating sensor degradation by setting a diagnostic code.

* * * * *